No. 859,137. PATENTED JULY 2, 1907.
F. T. SNYDER.
ELECTRIC FURNACE.
APPLICATION FILED JULY 25, 1906.
4 SHEETS—SHEET 1.
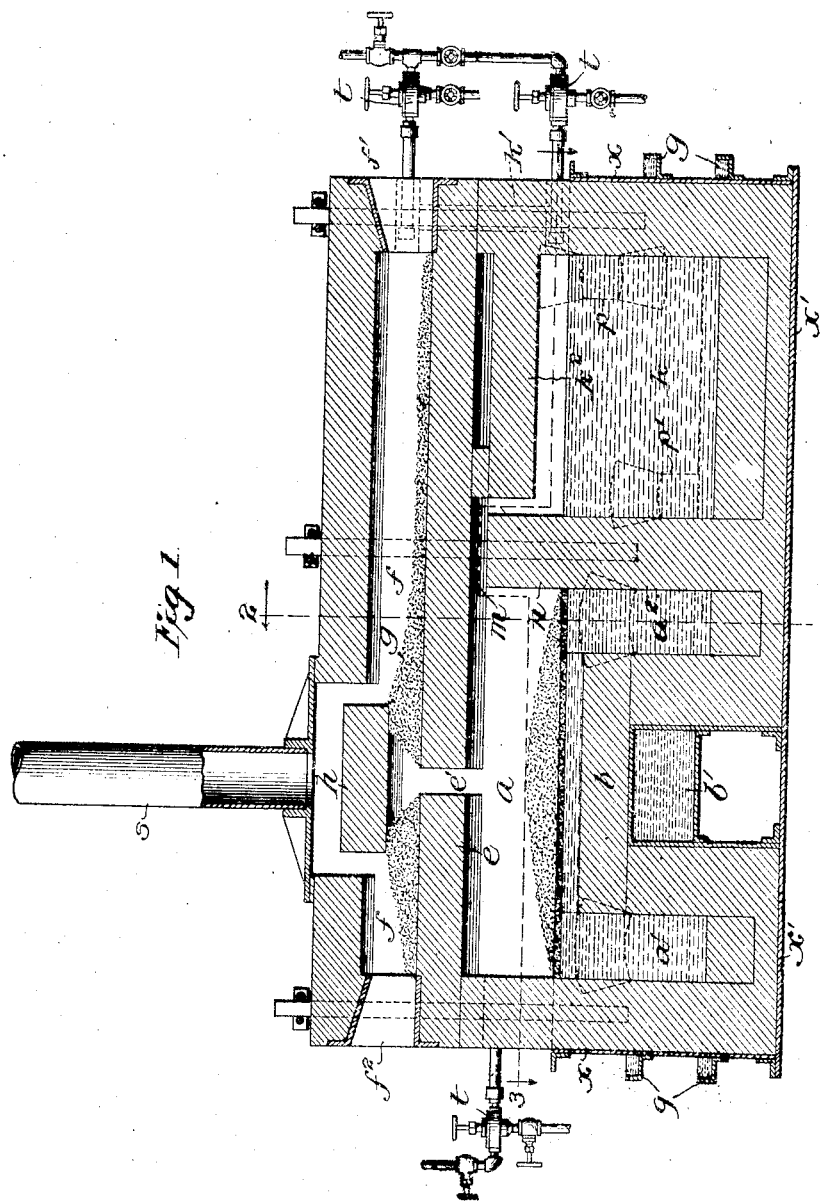
Witnesses:
Inventor,
Frederick T. Snyder,
By Barton Fanner & Folk
Attys.

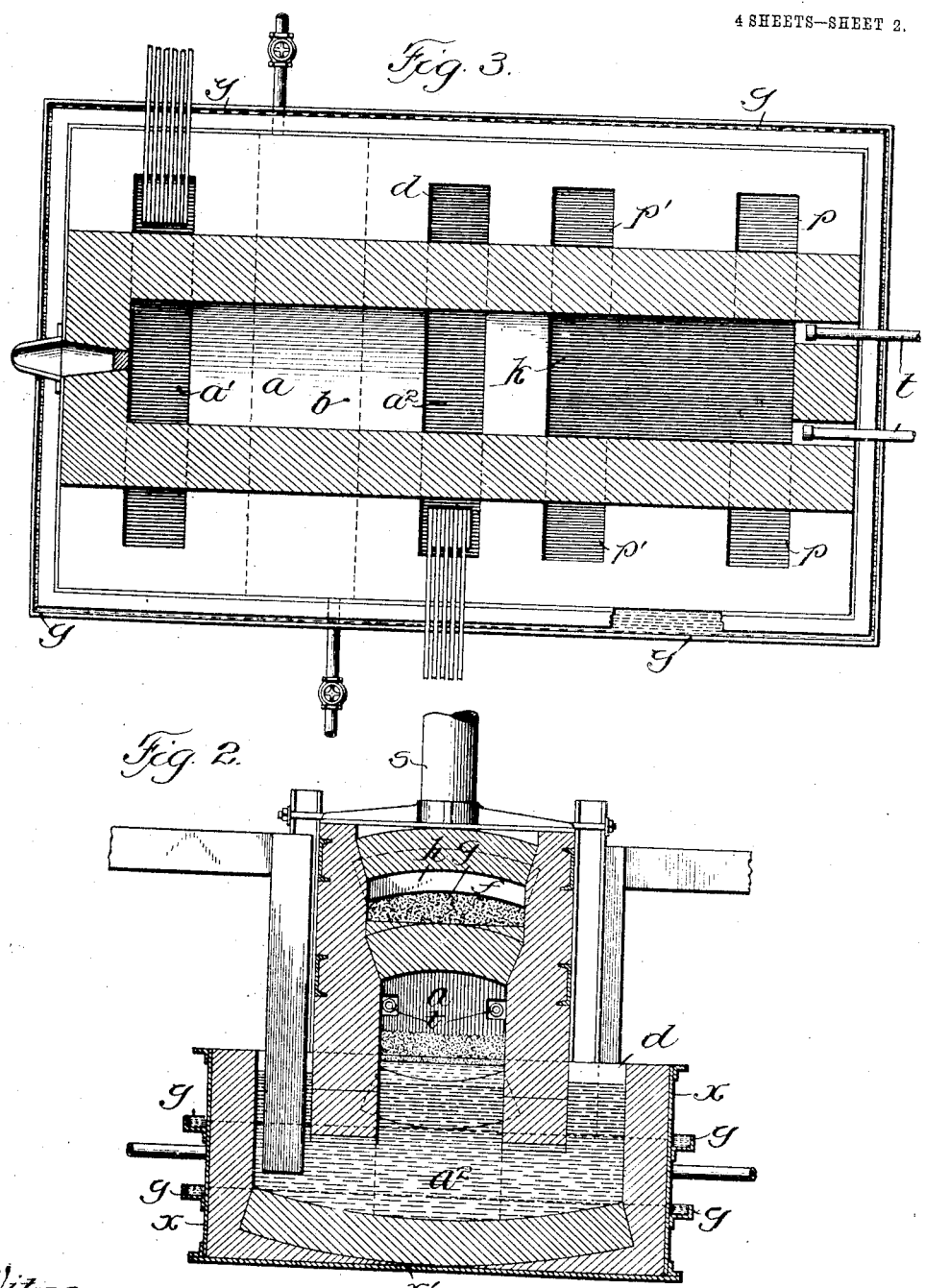

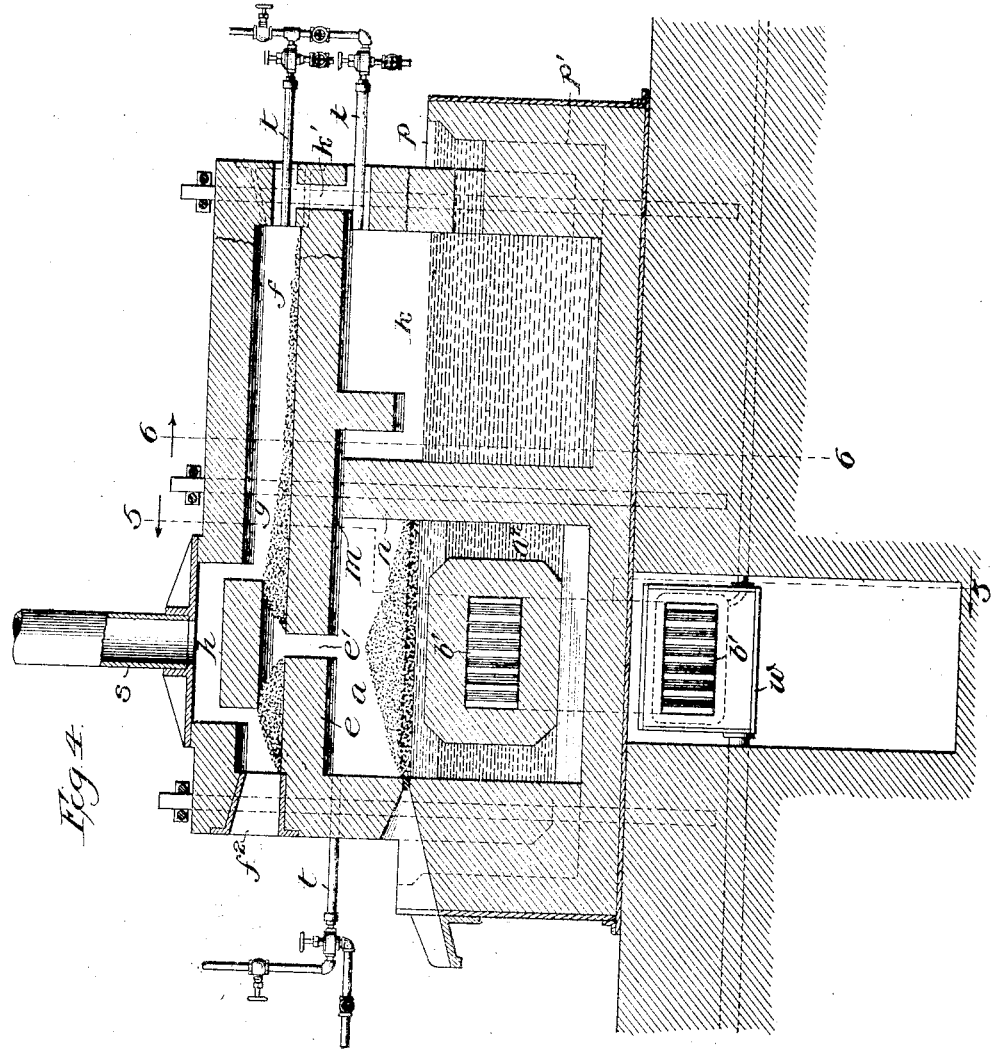

No. 859,137. PATENTED JULY 2, 1907.
F. T. SNYDER.
ELECTRIC FURNACE.
APPLICATION FILED JULY 25, 1906.
4 SHEETS—SHEET 4.
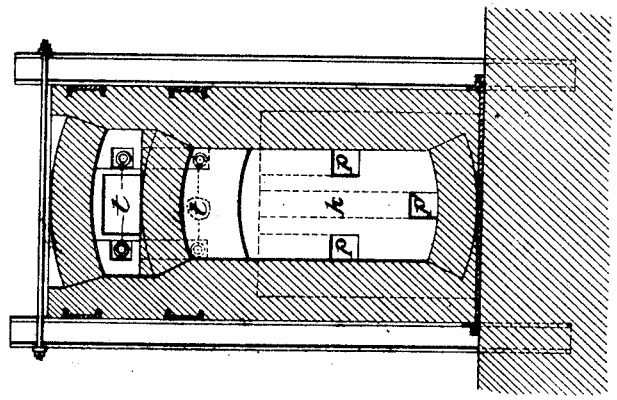
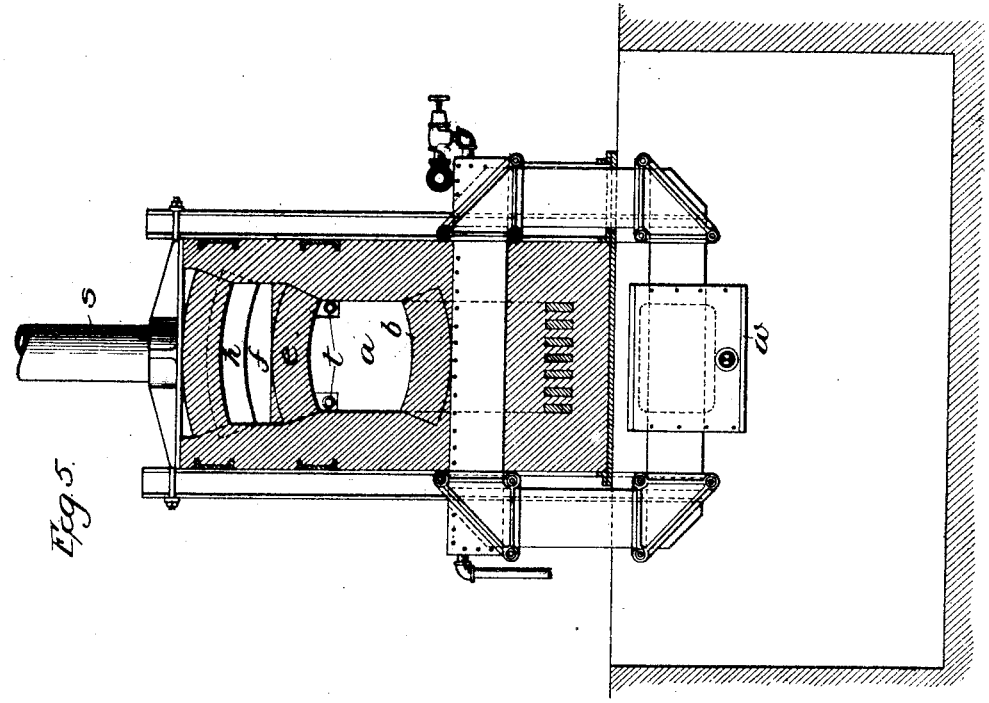
Witnesses:
Inventor:
Frederick T. Snyder.
By Barton Kenner & Foek
Attys.

UNITED STATES PATENT OFFICE.

FREDERICK T. SNYDER, OF OAK PARK, ILLINOIS, ASSIGNOR TO ELECTRIC METALS COMPANY, OF CHICAGO, ILLINOIS, A CORPORATION OF WEST VIRGINIA.

ELECTRIC FURNACE.

No. 859,137.

Specification of Letters Patent.

Patented July 2, 1907.

Application filed July 25, 1906. Serial No. 327,635.

*To all whom it may concern:*

Be it known that I, FREDERICK T. SNYDER, a citizen of the United States, residing at Oak Park, in the county of Cook and State of Illinois, have invented a certain new and useful Improvement in Electric Furnaces, of which the following is a full, clear, concise, and exact description.

My invention relates to an electric furnace, and its object is to provide an improved furnace which will be economical in operation and will be especially adapted for smelting ores, with particular reference to ores of metals such as zinc, which are volatile at reduction.

The invention contemplates a structure in which the materials to be smelted may be preheated by the waste gases of the smelting operation and also by the heat conducted through the walls of the smelting chamber, and the liquid metal condensed from the vapors of smelting may also be kept heated, the metallic product be refined and the different metals separately collected, all in the same furnace and in what may be called the same operation.

The invention also resides in certain structural details which make for simplicity, ease and economy of operation.

Two of the many forms which my invention may take are illustrated in the accompanying drawings, one type of furnace having the current led in by conductors dipping into the molten metal electrodes, while in the other type the materials to be heated constitute in themselves the secondary circuit of a transformer, current for heating said materials being induced therein by an alternating magnetic field set up by a suitably-energized primary coil.

Figure 1 is a sectional elevation of the first-mentioned type of furnace, in which current is led into the fused bath by conductors dipping into the molten electrodes; Fig. 2 is a transverse section on line 2—2 of Fig. 1; Fig. 3 is a sectional plan view on line 3—3 of Fig. 1; Fig. 4 is a sectional elevation of the transformer type of furnace; Fig. 5 is a transverse section on line 5—5 of Fig. 4; Fig. 6 is a transverse section on line 6—6 of Fig. 4.

The same letters of reference indicate the same parts wherever they appear.

Referring first to Fig. 1, the furnace is divided by a horizontal partition $e$ forming a preheating chamber $f$ in the upper portion of the furnace, while the lower portion is further divided by a transverse partition $n$, on one side of which is the smelting chamber $a$ and on the other side a combined condensing and refining chamber $k$. The horizontal partition $e$ which forms the roof of the smelting chamber, and at the same time the floor of the preheating chamber, is provided with a feed opening $e^1$ through which the materials $g$ in the preheating chamber may be fed into the smelting chamber. A cover $h$ is supported at a distance above the feed opening $e^1$ and overlaps said opening, so that materials in the heating chamber, when pushed toward the feed opening, may reach up to said cover and form a seal to prevent the escape of gas from the smelting chamber through the feed opening.

The smelting chamber communicates by a passage $m$ over the top of the partition $n$ with a combined condensing and refining chamber $k$, and from the last-mentioned chamber flues $k^1$ $k^1$ lead up through the end of the furnace to the preheating chamber $f$, so that the uncondensed gaseous products of smelting, after passing through the condensing chamber, may be burned in the preheating chamber to give up their energy and prepare the materials in the heating chamber for smelting. From the heating chamber the waste gases may pass off through a stack $s$. The chamber $k$ communicates with wells on the exterior of the furnace by means of passages $p$ $p^1$ through the side walls thereof below the level of the liquid metal in said chamber. One of these passages is near the bottom to withdraw the heavier metal, while the other one is near the top to withdraw the lighter metal. For example, in the smelting of lead-zinc ore, some lead vapor may be carried over with the zinc vapor into the condensing chamber, and the liquid metals in said chamber will there be refined, the lead settling out below the zinc and being withdrawn through the passage $p^1$, while the zinc may be withdrawn through the passage $p$ near the top of the chamber. I preferably provide a false roof $k^2$ for the condensing chamber to deflect the vapors coming from the smelting chamber into close contact with the liquid metal in the chamber $k$, to assist in condensing the metallic constituents of the vapors.

In the form of furnace shown in Fig. 1, the smelting chamber is provided with a bridge $b$ in the central portion thereof, dividing the chamber into two metal receptacles or wells $a^1$ $a^2$ on either side of the bridge, and a transverse passage above the bridge containing slag or other molten resistance material, the body of slag extending across the bridge and joining the metal in the two receptacles $a^1$ $a^2$. The furnace is heated by electric current passed through the body of slag from one molten electrode to the other, and the material to be smelted is fed from time to time through the opening $e^1$ onto the fused bath of slag. The bridge $b$ is preferably cooled internally by means of water flowing from a conduit $b^1$.

Current may be led into and out of the furnace in the following manner: Each of the metal receptacles communicates with a well, such as the well $d$ shown in Fig. 2, on the exterior of the furnace, by means of a passage extending under the walls. Preferably each of the metal receptacles $a^1$ $a^2$ communicates with wells or both sides of the furnace. The leading-in conductors for the electric current may then be dipped into the molten metal in the external wells, one at each end of the transverse passage, while the wells on the opposite sides of the furnace from said conductors will be free to permit the molten metal to be ladled out from time to time as it accumulates. Preferably the leading-in conductors are brought to the furnace on opposite sides thereof, so that the current will enter one end of the transverse passage on one side of the furnace, flow through the slag in said transverse passage, and then leave by way of the molten metal well on the opposite side of the furnace from which it entered. On each side of the furnace there will therefore be an electrode well and a free well from which molten metal may be ladled. By reference to Fig. 3, it will be seen that the furnace chamber in plan is H-shaped, the two arms of the H being the metal receptacles on opposite sides of the bridge, and the cross of the H being the transverse passage containing the slag or resistance material in which the heat is chiefly developed.

Preferably the lower portion of the furnace is inclosed in a metal jacket or caisson $x$, which is joined at the bottom with a sheet metal base plate $x^1$, forming a box in which the lower part of the furnace body is contained, giving additional strength to that portion of the structure which is filled with the heavy molten metal. Troughs $y$ $y$ are shown extending around the sides of the jacket $x$, these troughs serving to contain flowing water for cooling purposes.

In the form of furnace shown in Fig. 4 the smelting chamber is built in accordance with my Patent No. 825,359, dated July 10, 1906, the chamber being provided with a bridge extending across the same, in which one arm of a laminated iron core is embedded, the chamber being continuous around and under the bridge, whereby the material in said chamber forms a closed secondary circuit about said core. The lower arm of the transformer core is provided with a suitable primary induction coil winding, which in Fig. 4 is indicated as inclosed within the box $w$. In this form of furnace, when the primary coil is supplied with alternating current of suitable strength and voltage, an induced current will be set up in the materials in the chamber, constituting the secondary element of the transformer. The operation of this type of furnace is fully described in my prior patent above referred to.

It will be seen that in accordance with my invention the heat produced in smelting is utilized to the fullest extent, that which escapes through the partition $n$ serving to keep the molten metal in the condensing and refining chamber $k$ heated to the proper temperature, while the heat which escapes through the roof is communicated to the materials in the preheating chamber.
The refining chamber $k$ is further heated by the gaseous products of smelting, which are introduced through the passage $m$, and the non-condensed gases, after leaving the chamber $k$, give up additional heat in the preheating chamber $f$, where they are burned.
I preferably provide oil burners $t$ $t$ for heating the furnace at starting, or for supplying additional heat when required. During the smelting operation the burners applied to the chamber $k$ may be shut off and the openings plugged up with clay. The burners leading to the upper chamber $f$ may be kept in operation during the smelting, if desired, to furnish additional heat.

This type of furnace is particularly adapted for the smelting of lead-zinc ores, as the furnace includes a preheater, a smelting chamber and a condensing and refining chamber, all arranged in series, so to speak, and all inclosed within the same outer walls. In smelting such ores the furnace charge will first be heated preliminarily in the chamber $f$, then fed through the opening $c^1$ onto the fused bath in chamber $a$. Here the lead and zinc will be reduced, the lead sinking through the slag and adding to the molten metal in the wells $a^1$ $a^2$, while the zinc is volatilized and carried over through the passage $m$ into the chamber $k$. Here the zinc will be condensed, together with any small quantities of lead vapor which may also have been carried over, and the metallic product will be refined in the same chamber, the lead sinking to the bottom, from which it may be withdrawn through passage $p^1$, while the zinc collecting nearer the top may be withdrawn through the passage $p$.

I claim:

1. The combination with an electric smelting furnace, of a transverse partition dividing the furnace, a smelting chamber being formed on one side of said partition, the upper part of the chamber on the other side of said partition constituting a condensing chamber and the lower portion thereof a refining chamber, said several chambers being inclosed within the same outer walls of the furnace, and receiving heat from the smelting chamber, a passage being provided from the smelting chamber to the condensing chamber, and a flue for uncondensed gases leading out of said condensing chamber.

2. An electric furnace having a smelting chamber comprising a transverse passage containing molten resistance material, and metal receptacles at the ends of said transverse passage, communicating with said transverse resistance-passage and also communicating with the exterior of the furnace on the sides thereof, in combination with conductors dipping into an arm of each of said metal receptacles, leaving the other arms thereof free to permit the metal to be ladled out.

3. An electric furnace having a smelting chamber which in plan is H-shaped, the two arms of the H communicating with the exterior of the furnace and containing liquid metal, and the cross-passage being shallower than said arms and containing resistance material floating upon said liquid metal, in combination with electrodes dipping into the metal at the ends of said cross-passage.

4. The combination with an electric smelting furnace, of a transverse partition dividing the furnace, a smelting chamber being formed on one side of said partition, the upper part of the chamber on the other side constituting a condensing chamber and the lower portion thereof a refining chamber, a horizontal partition in the furnace forming a preheating chamber above said smelting and condensing chambers having an outlet leading to the smelting chamber, said several chambers being inclosed by the same outer walls to receive heat from the smelting chamber, a passage being provided from the smelting chamber to the condensing chamber and a flue for uncondensed gases leading out of said condensing chamber.

In witness whereof, I, hereunto subscribe my name this 14th day of July A. D., 1906.

FREDERICK T. SNYDER.

Witnesses:
  D. C. TANNER,
  A. H. MOORE.